United States Patent
Bogdan et al.

[11] Patent Number: 5,883,032
[45] Date of Patent: Mar. 16, 1999

[54] SELECTIVE MULTIMETALLIC MULTIGRADIENT REFORMING CATALYST

[75] Inventors: Paula L. Bogdan, Mount Prospect; Qianjun Chen, Des Plaines, both of Ill.

[73] Assignee: UOP LLC, Des Plaines, Ill.

[21] Appl. No.: 754,452

[22] Filed: Nov. 21, 1996

[51] Int. Cl.⁶ .......................... B01J 29/068; B01J 29/60; B01J 23/62
[52] U.S. Cl. .................. 502/66; 502/74; 502/332; 502/334; 502/349; 502/352
[58] Field of Search .................. 502/66, 334, 352, 502/349, 74, 73, 332

[56] References Cited

U.S. PATENT DOCUMENTS

| | | | |
|---|---|---|---|
| 3,259,589 | 7/1966 | Michalko | 252/466 |
| 4,104,320 | 8/1978 | Bernard et al. | 260/673.5 |
| 4,677,094 | 6/1987 | Moser et al. | 502/227 |
| 4,786,625 | 11/1988 | Imai et al. | 502/326 |
| 4,822,762 | 4/1989 | Ellig et al. | 502/66 |
| 4,914,068 | 4/1990 | Cross et al. | 502/74 |
| 4,923,595 | 5/1990 | Moser et al. | 208/139 |
| 5,292,976 | 3/1994 | Dessau et al. | 585/322 |
| 5,314,854 | 5/1994 | Galperin | 502/66 |
| 5,463,155 | 10/1995 | Galperin et al. | 585/310 |
| 5,464,800 | 11/1995 | Galperin et al. | 502/66 |
| 5,614,454 | 3/1997 | Galperin et al. | 502/66 |
| 5,665,223 | 9/1997 | Bogdan | 208/138 |

*Primary Examiner*—Bekir Yildirim
*Attorney, Agent, or Firm*—Thomas K. McBride; John F. Spears, Jr.; Richard E. Conser

[57] ABSTRACT

A reforming process, selective for the dehydrocyclization of paraffins to aromatics, is effected using a catalyst containing a uniformly distributed platinum-group metal component, a surface-layer metal component comprising one one more of the Group IVA metals and indium and a nonacidic large-pore molecular sieve. The use of this bed of catalyst results in greater selectivity of conversion of paraffins to aromatics and in improved catalyst stability.

13 Claims, 4 Drawing Sheets

SELECTIVE MULTIMETALLIC MULTIGRADIENT REFORMING CATALYST

BACKGROUND OF THE INVENTION

1. Field of the Invention

This invention relates to a catalyst and process for the conversion of hydrocarbons, and more specifically for the catalytic reforming of gasoline-range hydrocarbons.

2. General Background

The catalytic reforming of hydrocarbon feedstocks in the gasoline range is an important commercial process, practiced in nearly every significant petroleum refinery in the world to produce aromatic intermediates for the petrochemical industry or gasoline components with high resistance to engine knock. Demand for aromatics is growing more rapidly than the supply of feedstocks for aromatics production. Moreover, the widespread removal of lead antiknock additive from gasoline, reformulation of gasoline for reduced emissions, and the rising demands of high-performance internal-combustion engines are increasing the required knock resistance of the gasoline component as measured by gasoline "octane" number. The catalytic reforming unit therefore must operate more efficiently at higher severity in order to meet these increasing aromatics and gasoline-octane needs. This trend creates a need for more effective reforming processes and catalysts.

Catalytic reforming generally is applied to a feedstock rich in paraffinic and naphthenic hydrocarbons and is effected through diverse reactions: dehydrogenation of naphthenes to aromatics, dehydrocyclization of paraffins, isomerization of paraffins and naphthenes, dealkylation of alkylaromatics, hydrocracking of paraffins to light hydrocarbons, and formation of coke which is deposited on the catalyst. Increased aromatics and gasoline-octane needs have turned attention to the paraffin-dehydrocyclization reaction, which is less favored thermodynamically and kinetically in bifunctional reforming than other aromatization reactions. Considerable leverage exists for increasing desired product yields from catalytic reforming by promoting the dehydrocyclization reaction over the competing hydrocracking reaction while minimizing the formation of coke.

The effectiveness of reforming catalysts comprising a non-acidic L-zeolite and a platinum-group metal for dehydrocyclization of paraffins is well known in the art. The use of these reforming catalysts to produce aromatics from paraffinic raffinates as well as naphthas has been disclosed. The increased sensitivity of these selective catalysts to sulfur in the feed also is known. Commercialization has been slow in coming and is limited in scope in light of the special measures that must be taken to exclude sulfur from the process. There is a need for a catalysts demonstrating enhanced stability as well as improvements in the high selectivity featured by these dehydrocyclization catalysts.

The art discloses reforming with a broad range of catalysts containing large-pore zeolites and Group VIII metals. U.S. Pat. No. 4,104,320 (Bernard et al.) discloses dehydrocyclization with potassium-form L-zeolite charged with one or more dehydrogenating metals of Group VIII, but teaches that two metals would be introduced simultaneously and does not suggest the advantages of controlling the distribution of is metal in the catalyst. U.S. Pat. No. 4,914,068 (Cross et al.) teaches a method of dispersing at least one Group VIII metal in the pores of a large pore zeolite, along with a specified amount of a non-platinum metal salt.

Non-uniform distribution of metal within a catalyst has been disclosed for some catalysts. U.S. Pat. No. 3,259,589 (Michalko) discloses a variety of catalyst physical structures characterized by the placement of a layer of a metal component, but does not suggest that the metal component should comprise metals with different gradients. U.S. Pat. No. 4,677,094 (Moser et al.) teaches a trimetallic catalyst comprising uniform platinum and tin and a surface-impregnated metal selected from one or more of rhodium, ruthenium, cobalt, nickel, and iridium, and teaches that the surface-impregnated component is incorporated into the catalyst support of an acidic catalyst. U.S. Pat. No. 4,786,625 (Imai et al.) teaches a catalytic composite comprising surface-impregnated platinum group metal and uniform tin, germanium, or rhenium on a refractory oxide support. None of the above references anticipate or suggest a catalyst containing a nonacidic large-pore molecular sieve, a platinum-group metal component, and a surface-layer promoter metal.

SUMMARY OF THE INVENTION

It is an object of the present invention to provide a catalytic system and catalytic reforming process effective for the dehydrocyclization of paraffins with high catalyst selectivity and stability.

This invention is based on the discovery that a bound L-zeolite catalyst containing surface-layer tin or indium and uniformly distributed platinum results in substantial yield improvements in a catalytic reforming process.

A broad embodiment of the present invention is a catalyst particle, selective for dehydrocyclization of paraffins, comprising a bound nonacidic large-pore molecular sieve and a multimetallic, multigradient metal component comprising at least one platinum-group metal and a metal promoter. Preferably the metal component comprises uniformly distributed platinum and a surface-layer metal promoter comprising one or more of the Group IVA (IUPAC 14) metals and indium. Most preferably, the surface-layer metal component comprises tin and/or indium, and gradients of the metals may be determined by SEM. Optimally, the nonacidic L-zeolite is potassium-form L-zeolite. An alternative embodiment comprises a physical mixture of particles of the nonacidic catalyst particle of the invention with acidic catalyst particles comprising one or more inorganic oxides and preferably having the absence of a platinum-group metal.

In another aspect, the invention is a reforming process, selective for dehydrocyclization of paraffins, using a bed of particles of a catalyst comprising a bound nonacidic large-pore molecular sieve and a multimetallic, multigradient metal component comprising a uniform platinum-group metal and a surface-layer metal selected from one or more of the Group IVA (IUPAC 14) metals and indium.

These as well as other objects and embodiments will become apparent from the detailed description of the invention.

DESCRIPTION OF THE PREFERRED EMBODIMENTS

Broad embodiments of the present invention are directed to a catalyst particle, and reforming process using a bed of the catalyst particles, containing a nonacidic large-pore molecular sieve and multimetallic, multigradient metal component comprising at least one platinum-group metal component and a metal promoter. The metal promoter is a surface-layer component comprising one or more metals of Group IVA (IUPAC 14) of the Periodic Table [See Cotton and Wilkinson, *Advanced Inorganic Chemistry*, John Wiley & Sons (Fifth Edition, 1988)]. An alternative embodiment comprises a physical mixture of the above nonacidic catalyst particles with acidic catalyst particles comprising one or more inorganic oxides and preferably having the absence of a platinum-group metal. The present catalyst has been found to be surprisingly selective and stable, in comparison to catalysts of the prior art, in reforming paraffinic feedstocks to achieve high yields of aromatics.

The invention is characterized for a catalyst particle, such as would be contained in a bed of catalyst particles in a reaction vessel in a hydrocarbon-reforming process unit. The preferred catalyst particle of the present invention is an extrudate, usually cylindrical in shape and having a diameter of about 0.8 to 3.2 mm (especially 1.5 to 2.2 mm) and a length to diameter ratio of about 1:1 to 5:1, with 2:1 to 3:1 being especially preferred. Other particle shapes known in the art are within the scope of the invention such as spheres, rods, pills, pellets, tablets or granules; spherical particles may be formed directly or from extrudates by rolling the extrudate particles on a spinning disk.

An essential component of the catalyst particles is a non-acidic large-pore molecular sieve. Suitable molecular sieves generally have a maximum free channel diameter or "pore size" of 6 Å or larger, and preferably have a moderately large pore size of about 7 to 8 Å. Such molecular sieves include those characterized as AFI, BEA, FAU or LTL structure type by the IUPAC Commission on Zeolite Nomenclature, with the LTL structure being preferred. It is essential that the preferred L-zeolite be non-acidic, as acidity in the zeolite lowers the selectivity to aromatics of the finished catalyst. In order to be "non-acidic," the zeolite has substantially all of its cationic exchange sites occupied by nonhydrogen species. Preferably the cations occupying the exchangeable cation sites will comprise one or more of the alkali metals, although other cationic species may be present. An especially preferred nonacidic L-zeolite is potassium-form L-zeolite.

It is necessary to composite the L-zeolite with a binder in order to provide a convenient form for use in the catalyst particles of the present invention. The art teaches the suitablity of a variety of refractory inorganic oxide binders. One or more of silica, alumina or magnesia are preferred binder materials of the present invention. One or both of amorphous silica and alumina are especially preferred. In one embodiment, excellent results are obtained when using a synthetic white silica powder precipitated as ultra-fine spherical particles from a water solution. A silica binder preferably is nonacidic, contains less than 0.3 mass-% sulfate salts, and has a BET surface area of from about 120 to 160 m²/g.

The L-zeolite and binder may be composited to form particle shapes known to those skilled in the art such as spheres, extrudates, rods, pills, pellets, tablets or granules. Spherical particles may be formed directly by the oil-drop method as disclosed hereinbelow or from extrudates by rolling extrudate particles on a spinning disk. In one method of forming extrudates, potassium-form L-zeolite and amorphous silica are commingled as a uniform powder blend prior to introduction of a peptizing agent. An aqueous solution comprising sodium hydroxide is added to form an extrudable dough. The dough preferably will have a moisture content of from 30 to 50 mass-% in order to form extrudates having acceptable integrity to withstand direct calcination. The resulting dough is extruded through a suitably shaped and sized die to form extrudate particles, which are dried and calcined generally by known methods. Preferably, extrudates are subjected directly to calcination without an intermediate drying step in order to encapsulate potassium ions and preserve basicity. The calcination of the extrudates is effected in an oxygen-containing atmosphere at a temperature of from about 260° C. to 650° C. for a period of about 0.5 to 2 hours.

An alternative alumina-bound form of the present catalyst support is a sphere. Alumina-bound spheres may be continuously manufactured by the well known oil-drop method which comprises: forming an alumina hydrosol by any of the techniques taught in the art and preferably by reacting aluminum metal with hydrochloric acid; combining the resulting hydrosol with the zeolite and a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 150° C. to about 205° C. and subjected to a calcination procedure at a temperature of about 450° C. to about 700° C. for a period of about 1 to about 20 hours. This treatment effects conversion of the alumina hydrogel to the corresponding crystalline gamma-alumina. U.S. Pat. No. 2,620,314 provides for additional details and is incorporated herein by reference thereto.

A reforming-catalyst support may incorporate other porous, adsorptive, high-surface-area materials. Within the scope of the present invention are refractory supports containing one or more of: (1) refractory inorganic oxides such as alumina, silica, titania, magnesia, zirconia, chromia, thoria, boria or mixtures thereof, (2) synthetically prepared or naturally occurring clays and silicates, which may be acid-treated; (3) crystalline zeolitic aluminosilicates, either naturally occurring or synthetically prepared such as FAU, MEL, MFI, MOR, MTW (IUPAC Commission on Zeolite Nomenclature), in hydrogen form or in a form which has been exchanged with metal cations; (4) spinels such as $MgAl_2O_4$, $FeAl_2O_4$, $ZnAl_2O_4$; and (5) combinations of materials from one or more of these groups.

An alkali-metal component is a highly preferred constituent of the reforming catalyst particles. One or more of the alkali metals, including lithium, sodium, potassium, rubidium, cesium and mixtures thereof, may be used, with potassium being preferred. The alkali metal optimally will occupy essentially all of the cationic exchangeable sites of the non-acidic L-zeolite as described hereinabove. Surface-deposited alkali metal also may be present as described in U.S. Pat. No. 4,619,906, incorporated herein by reference thereto.

An essential ingredient of catalyst particles of the invention is a multimetallic, multigradient metal component comprising at least one platinum-group metal and a metal promoter selected from one or more of the Group IVA (IUPAC 14) ["Group IVA"] metals and indium. "Multigradient" designates the differing distribution of two or more metals within the catalyst particle. The platinum-group metal is relatively uniformly distributed throughout the catalyst particle. The metal promoter comprising one or more of the Group IVA metals and indium is present as a "surface-layer" component as described hereinbelow. The ratio of surface-layer to uniformly distributed metal usually is in the range of from about 50:1 to 1:20, and optimally from about 20:1 to 1:10, on an elemental mass basis.

Of the Group VIII platinum-group noble metals, i.e., platinum, palladium, rhodium, ruthenium, osmium and iridium, platinum is preferred as the uniformly distributed metal. Mixtures of platinum-group metals as the uniformly distributed component also are within the scope of this invention. The platinum-group metal component may exist within the final catalytic composite as a compound such as an oxide, sulfide, halide, or oxyhalide, in chemical combination with one or more of the other ingredients of the composite, or as an elemental metal. Best results are obtained when substantially all of the metals are present in the elemental state. The platinum-group metal component may be present in the final catalyst composite in any amount which is catalytically effective, but relatively small amounts are preferred. The uniformly distributed platinum-group metals generally will comprise from about 0.01 to 5 mass-% of the final catalyst, and preferably about 0.05 to 2 mass-%, calculated on an elemental basis.

A metal component selected from at least one Group IVA metal and indium is concentrated in the surface layer of each catalyst particle. In defining the present invention, "layer" is a stratum of a catalyst particle of substantially uniform thickness at a substantially uniform distance from the surface of the catalyst particle. The "surface layer" is the layer of the catalyst particle adjacent to the surface of the particle. The surface-layer concentration is the average of measurements within a surface layer which may be 50 to 100 microns deep or represent 10% or 20% of the radius of the catalyst particle. The concentration of surface-layer Group IVA metal tapers off in progressing from the surface to the center of the catalyst particle, and is substantially lower in the "central core" of the particle than in its surface layer. "Central core" is defined, in characterizing the present invention, as a core of a catalyst particle representing 50% of the diameter or, alternatively, 50% of the volume of the particle. "Diameter" is defined as the minimum regular dimension through the center of the catalyst particle; for example, this dimension would be the diameter of the cylinder of an extrudate. "Radius" is defined as the distance from the surface to the center of the catalyst particle, being half of the diameter of the particle. For the preferred extrudates of the present invention, the central core is a concentric cylindrical portion excluding the surface layer at the side and ends of the cylindrical extrudate particles; a central core having 50% of the volume of the extrudate particle generally would have a diameter 70–75% of that of the particle. These definitions, do not exclude the use of other quantitative criteria for defining the gradient of metal concentration in a catalyst particle. In the present invention, however, the surface-layer component is measured as the concentration in the layer which extends 100 microns from the surface of the particle and the central core represents 50% of the diameter of the particle.

Preferably, measurement of the surface-layer concentration is effected as the average of the concentration closest to the surface of at least three catalyst particles. A "surface-layer" metal of the present catalyst has a concentration in the surface layer of the catalyst particle that is at least twice the concentration in the central core of the catalyst particle. More preferably, the surface-layer concentration of Group IVA metal is at least about three times the concentration in the central core. In an alternative definition, about 50% or more of a surface-layer metal is contained in the surface layer of a catalyst.

The surface-layer promoter metal, comprising one or more of the Group IVA metals (tin, germanium and lead) and indium, may be incorporated into the catalyst particle in any manner suitable to effect a decreasing gradient of the metal from the surface to the center of the particle. The surface-layer Group IVA metal suitably is incorporated into the catalyst by spray impregnation. One example of this would be to place a spray nozzle within a rotating drum which holds a catalyst support. A solution of the salt of the surface-layer metal is ejected from the nozzle using air to form fine droplets of spray, which contact the support in the rotating drum for effective mixing. Suitable salts may comprise but are not limited to the nitrates, sulfates, acetates, chlorides, bromides, iodides, ammine complexes, and organometallics such as the alkyl and alkoxide compounds. The volume ratio of solution to support is sufficient to effect the desired concentration of surface-layer metal in the catalyst, and preferably would be from about 0.3 to 1.0. The promoter metal preferably comprises from about 0.05 to 5 mass-% of the catalyst, calculated as the average concentration in a bed of catalyst particles on an elemental basis.

The metal preferably is impregnated into the bound nonacidic zeolite as a compound which interacts strongly with the bound zeolite, maintaining the metal at or near the surface of the particle. Alternatively, a metal component is impregnated as a compound, especially a salt, which decomposes at a pH of about 5 or more. For example, the preferred metal is impregnated as a chloride salt which decomposes upon contacting a bound L-zeolite. Other means, which do not limit the invention, include using a compound of the metal which complexes with the bound zeolite or which does not penetrate into the interior of the particle. An example is a multi-dentated ligand, such as carboxylic acids or metal compounds containing amino groups, thiol groups, phosphorus groups or other polar groups which can bond strongly to an oxide support.

The gradient of the metal promoter preferably is determined by Scanning is Electron Microscopy ("SEM"). SEM determinations of local metal concentrations are effected on at least three sample particles from the bed. Samples are selected from the bed by techniques known to those of ordinary skill in the art. The SEM data show the approximate metals content of any one point within a catalyst particle, based on the metals distribution profile in relation to the quantity of support. The result of each analysis may not be based upon a zero point; attempting to integrate a distribution curve is not possible, and could lead to interpretation errors as the entire curve could be shifted either up or down. However, the data are useful for making relative comparisons of metal distributions.

The uniformly distributed platinum-group metal representing an essential segment of the multigradient metal component may be incorporated in the porous carrier material in any suitable manner, such as coprecipitation, ion-exchange or impregnation. Platinum is the preferred uniformly distributed metal, and optimally is incorporated into the catalyst utilizing a soluble, decomposable compound to impregnate the carrier material in a relatively uniform manner. For example, platinum may be added to the support by commingling the latter with an aqueous solution of chloroplatinic acid, ammonium chloroplatinate, bromoplatinic acid, platinum trichloride, platinum tetrachloride hydrate, platinum dichlorocarbonyl dichloride, tetraamine platinum chloride, dinitrodiaminoplatinum, sodium tetranitroplatinate (II), and the like. In addition, it is generally preferred to impregnate the carrier material after it has been calcined in order to minimize the risk of loss of the valuable platinum-group metal. Although it is within the scope of the invention that the surface-layer and uniformly distributed metals are incorporated into the catalyst simultaneously, any effective order of addition is acceptable and the surface-layer component can be added before or after addition of the uniformly distributed metal. Optimally, the uniformly distributed platinum-group metal component is incorporated into the catalyst prior to the addition of the surface-layer metal promoter.

As measured by SEM, a metal is considered uniformly distributed if the metal concentration at one stratum from determinations on three or more particles differs by less than about 50% from the average metal concentration on the particles. Preferably, the difference between the metal concentration at any stratum and the average for the entire particles is less than about 25%.

It is within the scope of the present invention that the catalyst may contain other metal components known to modify the effect of the platinum-group-metal component. Such metal modifiers may include but are not limited to rhenium, gallium, manganese, zinc, uranium, dysprosium, thallium and mixtures thereof. Catalytically effective amounts of such metal modifiers may be incorporated into the catalyst by any means known in the art. Generally an optional metal modifier is present in a concentration of from about 0.01 to 5 mass-% of the finished catalyst on an elemental basis. The catalyst preferably does not contain such metal modifiers, i.e., the metal component consists essentially of a platinum-group metal component and a surface-layer component selected from the group consisting of the Group IVA metals and indium.

The reforming catalyst may contain a halogen component. The halogen component may be either fluorine, chlorine, bromine or iodine or mixtures thereof with chlorine being preferred. Considering the nonacidic nature of the support, the halogen usually is incorporated into the catalyst only in association with the incorporation of a metal component. The halogen component is generally present in a combined state with the inorganic-oxide support. The halogen component is preferably well distributed throughout the catalyst and may comprise from more than 0.2 to about 15 wt. % calculated on an elemental basis, of the final catalyst.

The final reforming catalyst generally is dried at a temperature of from about 100° C. to 320° C. for about 0.5 to 24 hours, followed by oxidation at a temperature of about 300° C. to 550° C. (preferably above about 350° C.) in an air atmosphere for 0.5 to 10 hours. Preferably the oxidized catalyst is subjected to a substantially water-free reduction step at a temperature of about 300° C. to 550° C. (preferably above about 350° C.) for 0.5 to 10 hours or more. The reduction step may be performed in-situ as part of the plant startup if a dry atmosphere is maintained. Further details of the preparation and activation of embodiments of the sulfur-sensitive reforming catalyst are disclosed, e.g., in U.S. Pat. Nos. 4,619,906 (Lambert et al.) and 4,882,762 (Ellig et al.), which are incorporated into this specification by reference thereto.

In an optional embodiment, the catalyst comprises acidic particles which provide acid sites for such reactions as isomerization and cracking. The acidic particles comprise one or more refractory inorganic oxides such as alumina, silica, titania, magnesia, zirconia, chromia, thoria, boria or mixtures thereof. Preferably the acidic particles comprise two or more refractory inorganic oxides selected from alumina, boria, silica, titania and zirconia. Optimally the particles comprise alumina, suitably derived from any of the various hydrous aluminum oxides or alumina gels such as alpha-alumina monohydrate of the boehmite structure, alpha-alumina trihydrate of the gibbsite structure, beta-alumina trihydrate of the bayerite structure, and the like.

In an especially preferred embodiment, the acidic particles comprise alumina and boria in a mass ratio of from about 1:1 to 100:1. The boria may be composited with the alumina in any manner known in the art. Preferably, boria in the forms of $B_2O_3$ or as tetra- or pyro-boric acid is admixed with the alumina sol before oil dropping or combined with the alumina-containing dough to extrusion. Optionally, the particles consist essentially of alumina and boria.

An alternative preferred embodiment of the acidic particles comprises silica-alumina containing a weight ratio of silica to alumina of at from about 20:1 to about 1:100. Silica:alumina ratios of from about 4:1 up to about 1:20 are preferred. Any suitable method of preparation known in the art may be utilized. An amorphous, cogelled, oil-dropped silica-alumina is favored, prepared substantially as described hereinabove for alumina spheres.

It is within the scope of the present invention that the acidic particles further contain one or more of: (1) crystalline zeolitic aluminosilicates, either naturally occurring or synthetically prepared such as BEA, FAU, FER, LTL, MAZ, MEL, MFI, MOR, and MTW (IUPAC Commission on Zeolite Nomenclature), in hydrogen form or in a form which has been exchanged with metal cations; (2) non-zeolitic molecular sieves, such as aluminophosphates and silicoaluminophosphates, including but not limited to structure types AEL, AFI, AFO and ATO; (3) synthetically prepared or naturally occurring clays and silicates, which may or may not be acid-treated, for example attapulgus clay, diatomaceous earth, fuller's earth, kaolin and kieselguhr; (4) spinels such as $MgAl_2O_4$, $FeAl_2O_4$, $ZnAl_2O_4$, $CaAl_2O_4$; and (5) combinations of materials from one or more of these groups.

The inorganic oxide may be formed into any suitable shape or form known to those skilled in the art such as spheres, extrudates, rods, pills, pellets, tablets or granules. A preferred shape for the acidic particles is an extrudate. An alternative preferred form of the acidic particles is a sphere formed by use of the well known oil dropping technique substantially as described hereinabove.

The acidic particles are substantially free of platinum-group metals. "Substantially free" is defined herein as containing less than about 0.01 mass-% of a platinum-group metal, calculated on an elemental basis. Preferably the acidic particles are free of any metal component other than the inorganic oxides and molecular sieves disclosed above, and most preferably free of any metal other than those comprising alumina, magnesia, titania, zirconia and boria. The acidic particles optionally may contain a halogen component, however, generally present in a combined state with the inorganic-oxide and comprising from more than 0.2 to about 15 wt. %. calculated on an elemental basis, of the acidic particles.

The particles suitably will be dried at a temperature of from about 100° C. to 320° C. for about 0.5 to 24 hours, followed by oxidation at a temperature of about 300° C. to 550° C. in an air atmosphere for 0.5 to 10 hours.

It is believed, without limiting the invention, that Brönsted acidity is an important characteristic of the acidic particles. Therefore, it is preferable in characterizing the acidity of the acidic particles that the tests indicate the presence of Brönsted acidity. A suitable test for determining the acidity of the acidic particles involves the cracking of 1-heptene. The composites as 40–60 mesh particles are pretreated at 200°C. for 0.5 hr and 550° C. for 1 hr in a stream of hydrogen and loaded as a 250 mg sample into a microreactor. The test on 1-heptene is carried out at 425° C. at a base rate of 250 cc/min. Brönsted acidity is indicated by a high ratio of propane and butane, generally at least about 80 mass-% and preferably 90 mass-% or more, in the cracked products.

Acidity characteristics of the acidic particles also may be determined by nuclear magnetic resonance, or NMR, and especially magic-angle spinning NMR, or MASNMR. A powder sample is loaded in a glass tube and pretreated under high vacuum (ca. $10^{-6}$ torr) at, typically, 500° C. for 2 hr. The samples are cooled to 120° C., exposed to trimethylphosphine (TMP) for 15 min followed by a 45 min equilibration time, and then degassed with high vacuum. The amount of adsorbed TMP is calculated from the vapor-pressure change after condensation on the samples from the known volume of vacuum line. The total integrated $^{31}P$ NMR signal intensity was calculated for these samples based on the sample mass, number of NMR scans, and the signal size.

Other tests as known in the art, such as ammonia temperature-programmed desorption ($NH_3$ TPD) and temperature-programmed pyridine absorbance as characterized by infrared spectra (pyridine TPD FT-IR) may be used to characterize the acidity of the acidic particles.

In an alternative embodiment of the present invention, a physical mixture of catalyst particles comprising a non-acidic large-pore zeolite and acidic particles comprising an inorganic oxide is contained within a combined catalyst particle. In this embodiment, the nonacidic and acidic particles may be ground or milled together or separately to form particles of suitable size, preferably less than about 100 microns, which are supported in a suitable matrix. Optimally the matrix is selected from the inorganic oxides described hereinabove.

A hydrocarbon feedstock to the present reforming process comprises paraffins and naphthenes, and may comprise aromatics and small amounts of olefins, preferably boiling within the gasoline range. Feedstocks which may be utilized include straight-run naphthas, natural gasoline, synthetic naphthas, thermal gasoline, catalytically cracked gasoline, partially reformed naphthas or raffinates from extraction of aromatics. The distillation range may be that of a full-range naphtha, having an initial boiling point typically from 40° C.–80° C. and a final boiling point of from about 160° C.–210° C., or it may represent a narrower range within a lower final boiling point. Light paraffinic feedstocks, such as naphthas from Middle East crudes having a final boiling point of from about 100° C.–160° C., are preferred due to the specific ability of the process to dehydrocyclize paraffins to aromatics. Raffinates from aromatics extraction, containing principally low-value $C_6$–$C_8$ paraffins which can be converted to valuable B-T-X aromatics, are especially preferred feedstocks.

The hydrocarbon feedstock to the present process may contain small amounts of sulfur compounds, amounting to generally less than 10 parts per million (ppm) on an elemental basis. Preferably the hydrocarbon feedstock has been prepared by a conventional pretreating step such as hydrotreating, hydrorefining or hydrodesulfurization to convert such contaminants as sulfurous, nitrogenous and oxygenated compounds to $H_2S$, $NH_3$ and $H_2O$, respectively, which then can be separated from the hydrocarbons by fractionation. This pretreating preferably will employ a catalyst known to the art comprising an inorganic oxide support and metals selected from Groups VIB(IUPAC 6) and VIII(IUPAC 9-10). Alternatively or in addition to the conventional hydrotreating, the pretreating step may comprise contact with sorbents capable of removing sulfurous and other contaminants. These sorbents may include but are not limited to one or more of zinc oxide, iron sponge, high-surface-area sodium, high-surface-area alumina, nickel-on-alumina, activated carbons and molecular sieves. Preferably, the pretreating step will provide the reforming catalyst with a hydrocarbon feedstock having sulfur levels at least as low as disclosed in the prior art as desirable reforming feedstocks, e.g., 1 ppm to 0.1 ppm (100 ppb); sulfur levels of 0.5 to 0.15 ppm are usual in modern pretreating units.

Optionally, the hydrocarbon feedstock is essentially sulfur-free. Selective reforming catalysts for aromatization of paraffins are known to be highly sulfur-sensitive, and some benefit may be derived from a sulfur-free feedstock even when utilizing the present active, stable catalyst. Sulfur-free is defined as containing less than 20 parts per billion (ppb), and preferably less than 14 ppb, sulfur. The repeatability of the American National Standard test ASTM D 4045-87 is 20 ppb at a sulfur level of 0.02 ppm (20 ppb), and "sulfur free" according to this test therefore would be defined as less than 20 ppb sulfur. It is believed, however, that one laboratory testing a series of similar samples can detect differences at lower sulfur levels, e.g., 10 ng/ml or 14 ppb sulfur.

Operating conditions used in the process of the present invention include a pressure of from about 100 kPa to 6.0 MPa (absolute), with the preferred range being from about 100 kPa to 2.0 MPa and a pressure of below about 1.0 MPa being especially preferred. Free hydrogen preferably is supplied to the process in an amount sufficient to correspond to a ratio of from about 0.1 to 10 moles of hydrogen per mole of hydrocarbon feedstock. By "free hydrogen" is meant molecular $H_2$, not combined in hydrocarbons or other compounds. Preferably, the reaction is carried out in the absence of added halogen. The volume of catalyst corresponds to a liquid hourly space velocity of from about 0.5 to 40 $hr^{-1}$. The operating temperature generally is in the range of about 260° C. to 600° C. Temperature selection is influenced by product objectives, with higher temperatures effecting higher conversion of the feedstock to aromatics and light hydrocarbons. Hydrocarbon types in the feedstock also influence temperature selection, as naphthenes are largely dehydrogenated over the first portion of the reforming catalyst which the feedstock contacts with a concomitant sharp decline in temperature across the first catalyst bed due to the endothermic heat of reaction. The temperature generally is slowly increased during each period of operation to compensate for inevitable catalyst deactivation.

The reforming process may be effected in a reactor section comprising one reactor or in multiple reactors with provisions known in the art to adjust inlet temperatures to individual reactors. The feed may contact the catalyst system in each of the respective reactors in either upflow, downflow, or radial-flow mode. Since the preferred reforming process operates at relatively low pressure, the low pressure drop in a radial-flow reactor favors the radial-flow mode. As the predominant dehydrocyclization and dehydrogenation reactions are endothermic, the reactor section generally will comprise two or more reactors with interheating between reactors to compensate for the endothermic heat of reaction and maintain dehydrocyclization conditions.

The reforming process will produce an aromatics-rich effluent stream, with the aromatics content of the $C_5+$ portion of the effluent typically within the range of about 45 to 95 mass-%, and more usually no more than about 85 mass-%. The composition of the aromatics will depend principally on the feedstock composition and operating conditions, and generally will consist principally of $C_6$–$C_{12}$ aromatics. Benzene, toluene and $C_8$ aromatics will be the primary aromatics produced from the preferred light naphtha and raffinate feedstocks.

Using techniques and equipment known in the art, the aromatics-rich effluent usually is passed through a cooling zone to a separation zone. In the separation zone, typically maintained at about 0° C. to 65° C., a hydrogen-rich gas is separated from a liquid phase. The resultant hydrogen-rich stream can then be recycled through suitable compressing means back to the first reforming zone. The liquid phase from the separation zone is normally withdrawn and processed in a fractionating system in order to adjust the concentration of light hydrocarbons and produce an aromatics-containing reformate product.

The reactor section usually is associated with catalyst-regeneration options known to those of ordinary skill in the art, such as: (1) a semiregenerative unit containing fixed-bed reactors maintains operating severity by increasing temperature, eventually shutting the unit down for catalyst regeneration and reactivation; (2) a swing-reactor unit, in which individual fixed-bed reactors are serially isolated by manifolding arrangements as the catalyst become deactivated and the catalyst in the isolated reactor is regenerated and reactivated while the other reactors remain on-stream; (3) continuous regeneration of catalyst withdrawn from a moving-bed reactor, with reactivation and substitution of the reactivated catalyst, permitting higher operating severity by maintaining high catalyst activity through regeneration cycles of a few days; or: (4) a hybrid system with semiregenerative and continuous-regeneration provisions in the same unit. The preferred embodiment of the present invention is fixed-bed reactors in a semiregenerative unit.

An optional embodiment of the present invention is reforming of the hydrocarbon feedstock with a physical mixture of the reforming catalyst and a sulfur sorbent. The mixture is contained either in a fixed-bed reactor or in a moving-bed reactor whereby catalyst may be continuously withdrawn and added. The sulfur sorbent should not only be effective for removal of small amounts of sulfur compounds from hydrocarbon streams at reforming-catalyst operating conditions, but also be compatible with the reforming catalyst in order to maintain the activity of the catalyst. The sulfur sorbent comprises a metal oxide, preferably selected from oxides of the metals having an atomic number between 19 and 30 inclusive; these metals, particularly potassium, calcium, vanadium, manganese, nickel, copper and zinc are known to be effective for sulfur removal in various circumstances. The sorbent optimally comprises a manganese component. Manganese oxide has been found to provide reforming catalyst protection superior to the zinc oxide of the prior at, it is believed, due to possible zinc contamination of associated reforming catalyst. The manganese oxides include $MnO$, $Mn_3O_4$, $Mn_2O_3$, $MnO_3$, and $Mn_2O_7$. The preferred manganese oxide is MnO (manganous oxide). The manganese component may be composited with a suitable binder such as clays, graphite, or inorganic oxides including one or more of alumina, silica, zirconia, magnesia, chromia or boria in order to provide a second particle for the physical mixture of the present catalyst system. Preferably, the manganese component is unbound and consists essentially of manganese oxide. Even more preferably the manganese component consists essentially of MnO, which has demonstrated excellent results for sulfur removal and has shown adequate particle strength without a binder for the second particle of the present invention.

In yet another alternative embodiment of the present invention, the physical mixture of reforming catalyst particles and sulfur sorbent is contained within the same catalyst particle. In this embodiment, the catalyst particles and sorbent may be ground or milled together or separately to form particles of suitable size, preferably less than 100 microns, and the particles are supported in a suitable matrix. Preferably, the matrix is selected from the inorganic oxides described hereinabove.

Other embodiments and variants encompassed by and within the spirit of the present invention as claimed will be apparent to the skilled routineer. Examples follow which illustrate certain specific embodiments, and these particularly should not be construed to limit the scope of the invention as set forth in the claims.

EXAMPLES

Three parameters are especially useful in evaluating reforming process and catalyst performance, particularly in evaluating catalysts for dehydrocyclization of paraffins. "Activity" is a measure of the catalyst's ability to convert reactants at a specified set of reaction conditions. "Selectivity" is an indication of the catalyst's ability to produce a high yield of the desired product. "Stability" is a measure of the catalyst's ability to maintain its activity and selectivity over time.

The examples illustrate the effect especially on reforming catalyst activity and selectivity of utilizing catalyst particles prepared in the manner disclosed in the present invention.

Example I

The feedstock on which catalyst comparisons were based was an essentially sulfur-free naphtha having characteristics as follows:

| | | |
|---|---|---|
| Sp. gr. | | 0.736 |
| ASTM D-86, °C.: | IBP | 83 |
| | 10% | 93 |
| | 50% | 112 |
| | 50% | 136 |
| | EP | 161 |
| Mass-% | Paraffins | 60.4 |
| | Naphthenes | 26.7 |
| | Aromatics | 12.9 |

Catalytic reforming tests were performed on the above naphtha feedstock using catalysts of the invention in comparison with catalysts of the known art.

Example II

Zeolitic catalyst particles as known in the art, not of the invention and containing a single Group VIII (IUPAC 8-10) noble metal component consisting essentially of platinum, were used as a "Reference" catalyst, or Catalyst R. The platinum was impregnated as tetraamineplatinum chloride (TAPC) by evaporative impregnation onto an extruded support comprising about 50 mass-% potassium-form L-zeolite and 50 mass-% alumina. The impregnated particles were belt-oxidized for about 4 hours at 90° C.–150° C., air-dried for 3 hours at 150° C., and reduced with dry hydrogen for 1½ hours at 350° C.

The finished particles of Catalyst R had a platinum content of 1.07 mass-% on an elemental basis.

Example III

Bifunctional spherical catalyst particles of the prior art were prepared for additional comparisons with catalysts of the invention and designated control Catalyst X. Tin was incorporated into alumina sol, and the sol was oil-dropped to form 1.6-mm spheres which were steamed to dryness and calcined at about 650° C. The resulting calcined composite was impregnated with chloroplatinic acid in HCl to provide 0.38 mass-% platinum in the finished catalyst. Catalyst X was finished by drying and oxychlorination at 525° C. and reduced with pure hydrogen at 565° C.

The finished particles of Catalyst X had the following composition in mass-%:

| | |
|---|---|
| Tin | 0.3 |
| Platinum | 0.38 |
| Chloride | 1.1 |

Example IV

Catalyst particles containing platinum and tin were prepared according to the invention. Potassium-form L-zeolite and a silica binder were composited to form a support. Tin was impregnated as $SnCl_4$ substantially on the surface of the support, and the preparation was calcined in dry air for 2 hours at 350° C. Platinum was incorporated into the support by impregnation with TAPC. The catalyst particles then were finished by oxidation for 0.5 hour at 200° C. and 2 hours at 350° C. and reduced with hydrogen for 2 hours at 650° C.

The finished catalyst particles, designated as Catalyst A, had the following metals contents in mass-%:

| | |
|---|---|
| Tin | 0.16 |
| Platinum | 0.63 |

Example V

Catalyst particles containing platinum and indium were prepared according to the invention. Potassium-form L-zeolite and a silica binder were composited to form a support. Indium as $InCl_3$ and platinum as TAPC were coimpregnated into the support. The catalyst particles then were finished by oxidation for 0.5 hour at 200° C. and 2 hours at 350° C. and reduced with hydrogen for 2 hours at 450° C.

The finished catalyst particles, designated as Catalyst B, had the following metals contents in mass-%:

| | |
|---|---|
| Indium | 0.10 |
| Platinum | 0.71 |

Example VI

Catalyst particles A and B were evaluated by Scanning Election Microscopy (SEM). The purpose of this analysis was to identify the relative distribution of tin, indium and platinum across the radius of the catalyst particles. Three particles each of Catalysts A and B were evaluated in order to provide reliable average data.

The SEM data shows the approximate metals content of any one point within the catalyst pill, as indicated hereinabove, based on the metals distribution profile in relation to the support. The data are useful for making relative comparisons of metal distributions.

Figure 1:
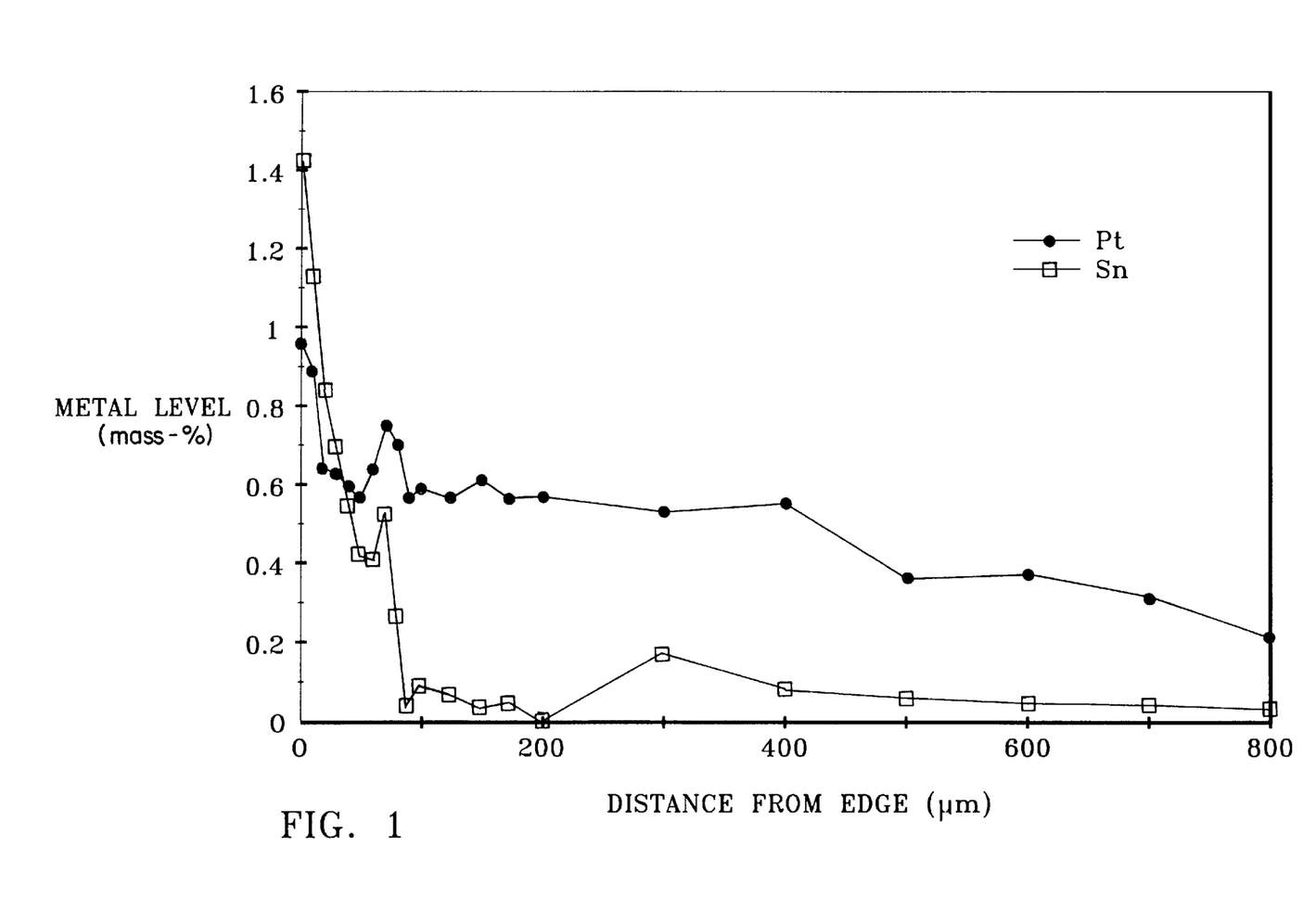
FIG. 1 shows platinum and tin gradients across the radius of catalyst particles in preparations of the invention exemplified hereinafter.

FIG. 1 shows the relative distribution of tin concentration across the 800-micron radius of particles of Catalyst A from the surface to the center of each particle. Catalyst A displayed an exceptionally high concentration of tin on a relative basis in the surface layer of the catalyst particles. The concentration of tin in the 100-micron surface layer of about 0.6+ mass-% was an order of magnitude (about ten times) higher than in the central core representing 50% of the diameter of the catalyst. The 100-micron surface layer representing 27% to 28% of the volume of the extruded catalyst particle contained about 75% of the tin in the average catalyst particle. However, according to FIG. 1, particles of Catalyst A displayed well distributed platinum.

Figure 2:
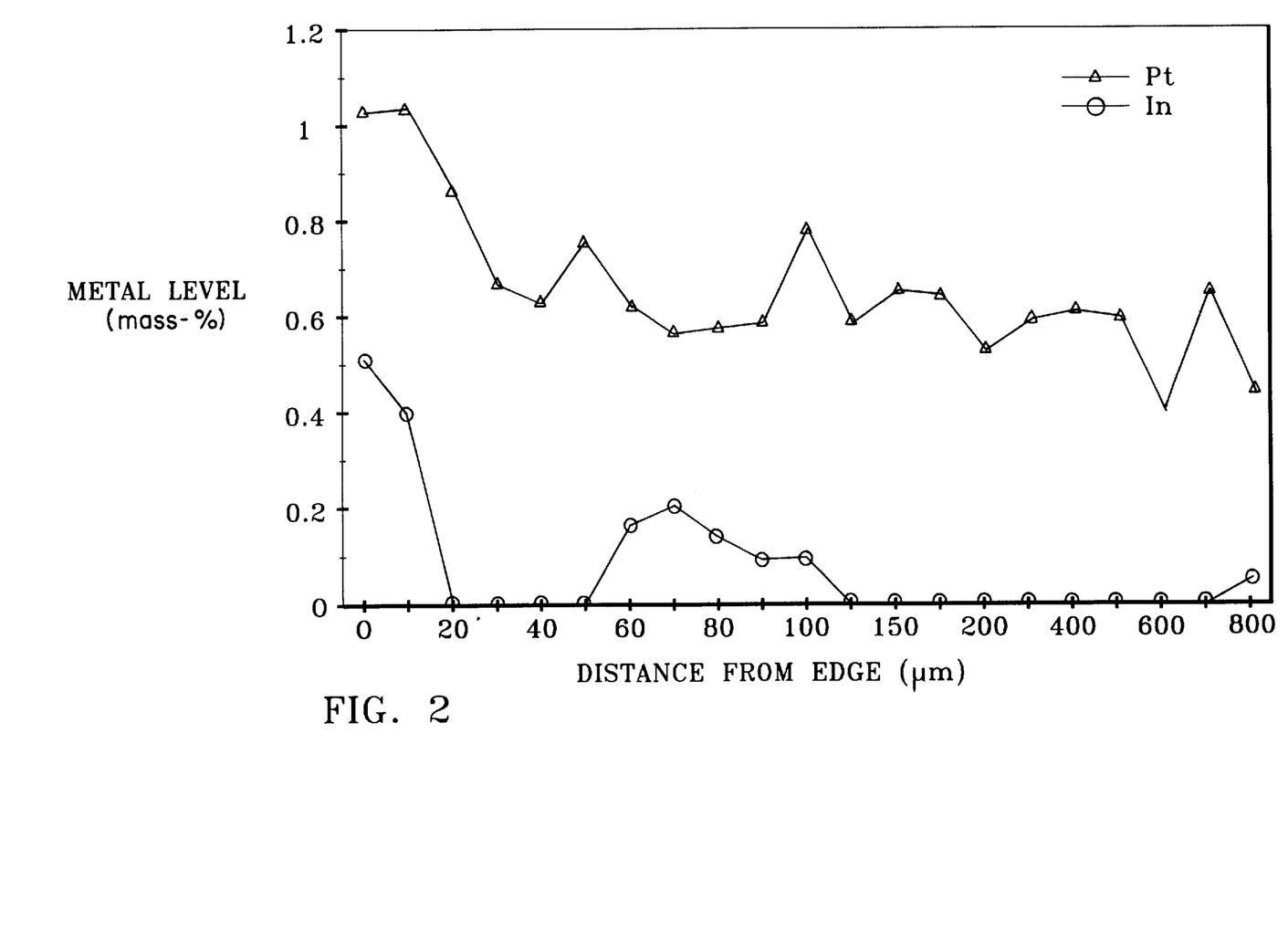
FIG. 2 shows platinum and indium gradients across the radius of catalyst particles for catalyst particles in preparations of the invention exemplified hereunder.

FIG. 2 shows the relative distribution of indium concentration across the 800-micron radius of particles of Catalyst B from the surface to the center of each particle. Catalyst B displayed an exceptionally high concentration of indium on a relative basis in the surface layer of the catalyst particles, particularly in the outer. 20-micron layer. The concentration of indium in the 100-micron surface layer of about 0.15 mass-% contrasted with an almost negligible concentration inside the 100-micron layer. According to FIG. 2, particles of Catalyst A displayed well distributed platinum.

Example VII

Particles of an acidic silica-alumina composites were prepared, tested to determine acidity characteristics, and used in a physical mixture with catalyst particles of the invention to reform naphtha.

Composite Y premix was prepared by adding a solution of water glass (30% $SiO_2$, 8.2% $Na_2O$) dropwise to a solution of 1:1 HCl containing urea powder. Al sol, 1.45 Al/Cl @ 14% Al, then was added to the acidified water glass solution. The premix was filtered, oil dropped and aged in oil at 95° C. for 18 hours. The spheres were subjected to a displacement solution containing 0.5% $NH_4NO_3$, then washed with water containing 0.5% $NH_4NO_3$ and $NH_3$, dried at 100° C. and calcined at 650° C. in 3% steam. Composite Y comprised silica and alumina in a mass ratio of about 37:63.

Example VIII

Catalysts A and B were tested in catalytic reforming of the naphtha feedstock characterized in Example I in comparison with control Catalysts R and X. Each of catalysts A and B were blended with acidic Catalyst Y in a mass ratio of 80/20, respectively designated A/Y and B/Y. Operating conditions were as follows:

| | |
|---|---|
| Pressure, MPa | 0.8 |
| Hydrogen/hydrocarbon, mol | 8 |
| Mass hourly space velocity, $hr^{-1}$ | 5 |

Figure 3:
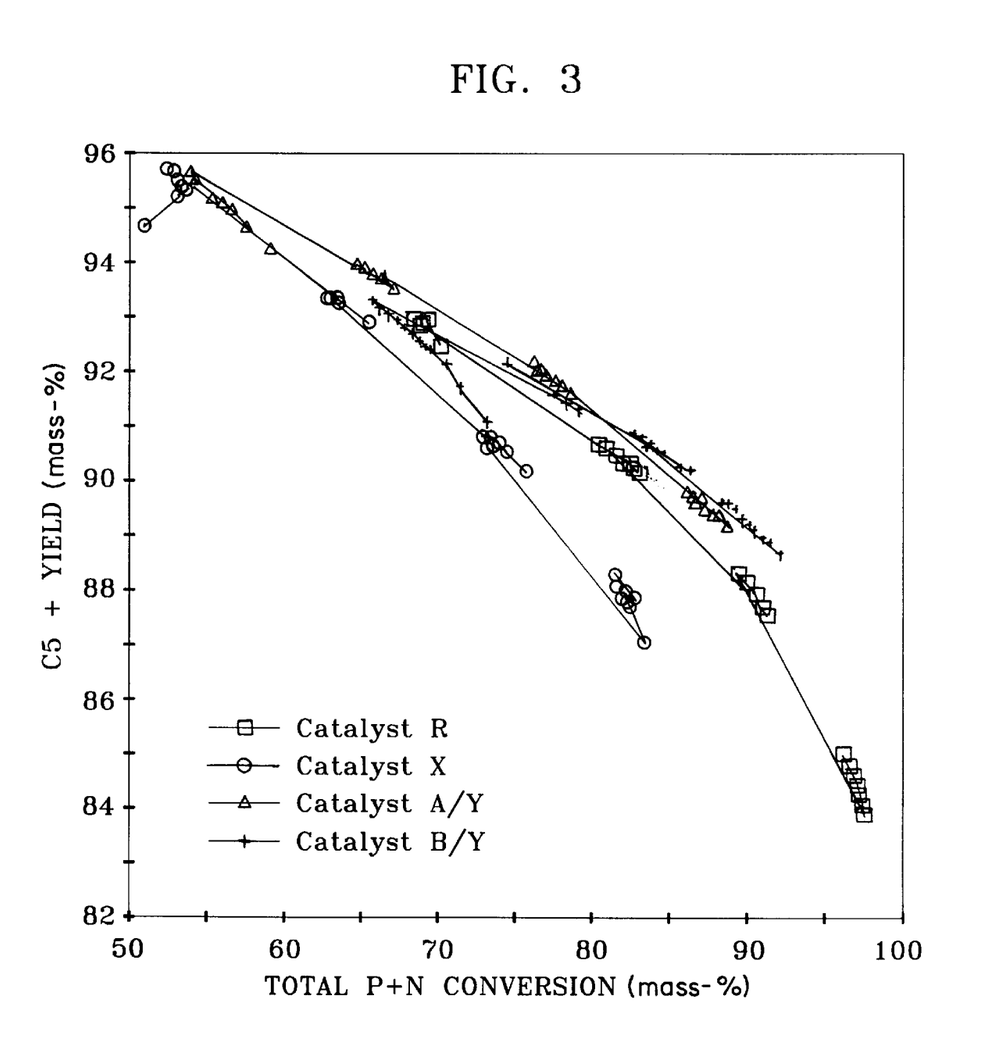
FIG. 3 shows $C_5+$ yield as a function of conversion of a naphtha feed using a platinum-tin catalyst particle of the present invention in comparison to prior-art control catalysts.

Temperature was adjusted as required to vary conversion of paraffins and naphthenes in the feedstock over a range of about 50% to about 90% or more as indicated in FIG. 3. Comparative results are plotted in FIG. 3 as yield of $C_5$+ product vs. conversion.

Catalysts A and B of the invention thus demonstrated an advantage in selectivity over the control catalysts of the art, with Catalyst A being favored at relatively lower conversion and Catalyst B showing an advantage at higher conversion.

Example IX

Figure 4:
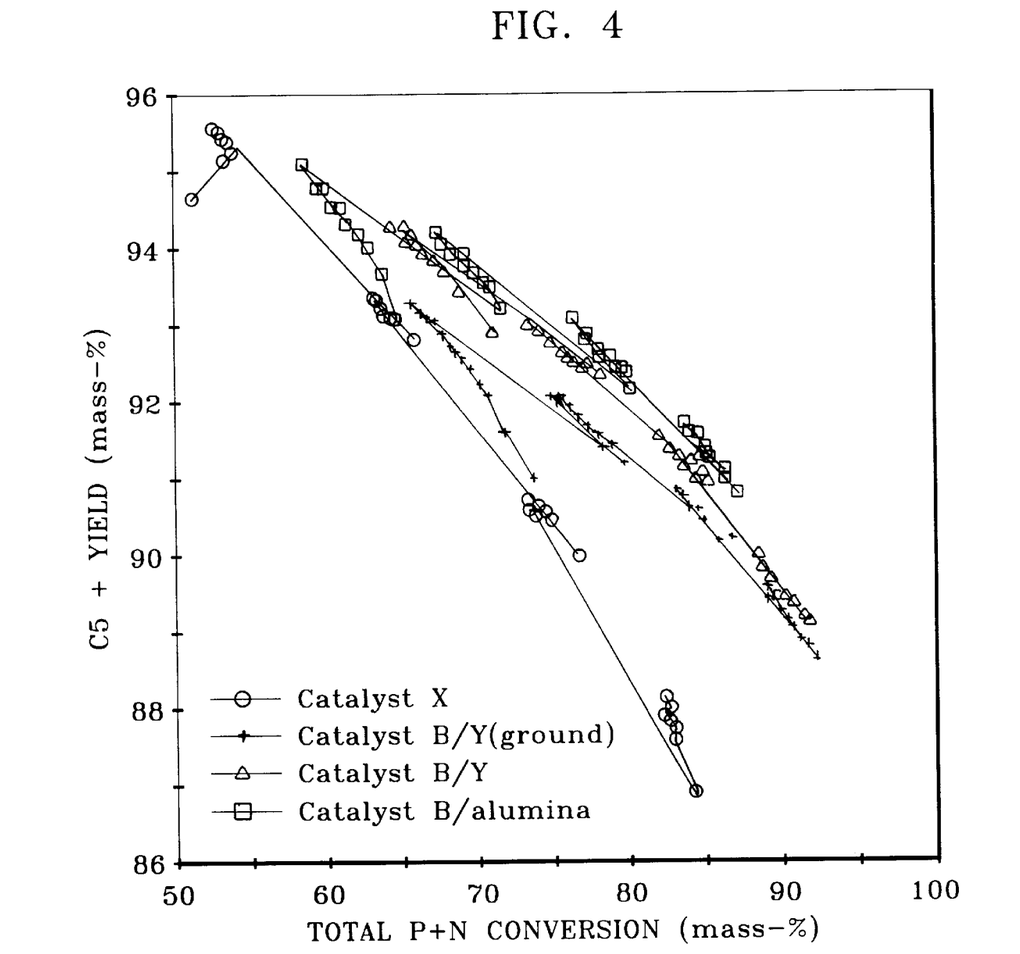
FIG. 4 shows $C_5+$ yield as a function of conversion of a naphtha feed using a platinum-indium catalyst particle of the present invention in comparison to prior-art control catalysts.

Catalyst B was subjected to further testing in order to establish the advantage of concentrating promoter metal in the surface layer and to compare alternative acidic catalysts. The 80/20 Catalyst B/Y mixture of Example VIII was ground to 40–60 mesh [designated B/Y-ground] and tested under the same conditions as in Example VIII. A physical mixture of Catalyst B and alumina in a mass ratio of 80:20 [designated B/alumina]also was tested at the same conditions. The results are compared with the results of testing Catalyst B/Y and Catalyst X, derived from FIG. 3, in FIG. 4.

The mixture of Catalyst B and alumina also shows favorable selectivity. The whole-particle catalysts demonstrate better selectivity than the ground catalyst, indicating that surface-layer metal is the key factor in the improved yields demonstrated by the catalysts of the invention.

We claim:

1. A catalyst particle suitable for the reforming of hydrocarbons comprising:
   (a) a multigradient metal component comprising at least one uniformly distributed platinum-group metal and a surface-layer promoter-metal component selected from one or more of the group consisting of the Group IVA (IUPAC 14) metals and indium;
   (b) a nonacidic large-pore molecular sieve having a maximum free channel diameter of from 6 Å to about 8 Å; and,
   (c) an inorganic-oxide binder.

2. The catalyst particle of claim 1 wherein the concentration of the promoter metal in the 100-micron surface layer of particles of the catalyst is at least about twice the concentration of said metal in the central core of particles of the catalyst.

3. The catalyst particle of claim 2 wherein the concentration of promoter metal in the 100-micron surface layer of particles of the catalyst is at least about three times the concentration of said metal in the central core of particles of the catalyst.

4. The catalyst particle of claim 1 wherein the noble-metal component consists essentially of platinum.

5. The catalyst particle of claim 1 wherein the multigradient metal component comprises uniformly distributed platinum and surface-layer tin.

6. The catalyst particle of claim 1 wherein the multigradient metal component consists essentially of distributed platinum and surface-layer tin.

7. The catalyst particle of claim 1 wherein the multigradient metal component comprises uniformly distributed platinum and surface-layer indium.

8. The catalyst particle of claim 1 wherein the nonacidic large-pore molecular sieve comprises nonacidic L-zeolite.

9. The catalyst particle of claim 8 wherein the nonacidic L-zeolite comprises potassium-form L-zeolite.

10. The catalyst particle of claim 1 wherein the binder comprises one or both of silica and alumina.

11. The catalyst particle of claim 1 contained in a bed of catalyst particles further comprising acidic catalyst particles in a physical particle-form mixture.

12. A catalyst particle suitable for the reforming of hydrocarbons comprising:
    (a) a multigradient metal component comprising uniformly distributed platinum and a surface-layer metal component selected from one or both of tin and indium;
    (b) potassium-form L-zeolite; and,
    (c) an inorganic-oxide binder.

13. A method of preparing a catalyst particle suitable for the reforming of hydrocarbons comprising:
    (a) compositing a nonacidic large-pore molecular sieve having a maximum free channel diameter of from 6 Å to about 8 Å and an inorganic binder to form a catalyst support;
    (b) incorporating a uniformly distributed platinum-group metal component and a surface-layer metal component selected from components of one or more of the group consisting of the Group IVA (IUPAC 14) metals and indium into the support to form a composite; and,
    (c) finishing the composite to form a catalyst particle by one or both of calcination and reduction.

* * * * *